US008905271B2

(12) United States Patent
Maas et al.

(10) Patent No.: US 8,905,271 B2
(45) Date of Patent: Dec. 9, 2014

(54) SPRAYER DEVICE WITH AEROSOL FUNCTIONALITY (“FLAIROSOL”)

(75) Inventors: Wilhelmus Johannes Joseph Maas, Someren (NL); Petrus Lambertus Wilhelmus Hurkmans, Someren (NL); Aaron S. Haleva, Oakhurst, NJ (US)

(73) Assignee: Dispensing Technologies B.V., Helmond (NL)

( * ) Notice: Subject to any disclaimer, the term of this patent is extended or adjusted under 35 U.S.C. 154(b) by 94 days.

(21) Appl. No.: 13/068,267

(22) Filed: May 5, 2011

(65) Prior Publication Data

US 2012/0048959 A1 Mar. 1, 2012

Related U.S. Application Data

(60) Provisional application No. 61/343,977, filed on May 5, 2010, provisional application No. 61/456,349, filed on Nov. 4, 2010.

(51) Int. Cl.
*G01F 11/00* (2006.01)
*B05B 9/08* (2006.01)

(52) U.S. Cl.
CPC .................................... *B05B 9/0822* (2013.01)
USPC ........................................... 222/340; 222/341

(58) Field of Classification Search
USPC ........... 222/340, 383.1, 402.1, 571, 341, 105, 222/183
See application file for complete search history.

(56) References Cited

U.S. PATENT DOCUMENTS

| | | | | |
|---|---|---|---|---|
| 3,779,464 | A * | 12/1973 | Malone | 239/350 |
| 4,155,485 | A * | 5/1979 | Spatz | 222/179.5 |
| 2002/0108970 | A1* | 8/2002 | Shanklin et al. | 222/321.9 |
| 2008/0230563 | A1* | 9/2008 | Maas et al. | 222/383.1 |

FOREIGN PATENT DOCUMENTS

| | | | |
|---|---|---|---|
| WO | WO 2009096777 | A1 * | 8/2009 |
| WO | WO 2010014004 | A2 * | 2/2010 |

* cited by examiner

*Primary Examiner* — Paul R Durand
*Assistant Examiner* — Vishal Pancholi
(74) *Attorney, Agent, or Firm* — Kramer Levin Naftalis & Frankel LLP

(57) ABSTRACT

A liquid dispensing device is presented. The device has a main body and a dispensing head. The main body includes a pressure chamber, a pressure spring and a pressure piston, and the dispensing head includes a piston and a piston chamber, a channel in fluid communication with the pressure chamber, an inlet valve provided between said channel and said piston chamber, an outlet valve, an outlet channel, and an outlet valve lock.

22 Claims, 18 Drawing Sheets
(15 of 18 Drawing Sheet(s) Filed in Color)

FLAIROSOL - TWO VARIETIES

TRIGGER FLAIR- WITH ACTIVATION BUTTON

WITH ACTIVATION BUTTON

FLAIROSOL- CONTINUOUS SPRAY

CONTINUOUS SPRAY

SPRAYER DEVICE WITH AEROSOL FUNCTIONALITY ("FLAIROSOL")

CROSS REFERENCE TO RELATED APPLICATIONS

This application claims the benefit of U.S. Provisional Patent Applications Nos. 61/343,977, filed on 5 May 2010, and 61/456,349, filed on 4 Nov. 2010, the disclosures of each of which are hereby fully incorporated herein by reference.

TECHNICAL FIELD

The present invention relates to dispensing technologies, and in particular to a sprayer device that can place liquids under pressure and dispense them in a manner equivalent to that of an aerosol device or can, in either (i) a user controlled manner; or (ii) a continuous spray manner.

BACKGROUND OF THE INVENTION

Liquid dispensing devices such as spray bottles are well known. Some offer pre-compression so as to insure a strong spray when the trigger is pulled and prevent leakage. Sprayers can be easily manufactured and filled, and are often used to dispense cleaners of all types, for example. However, in many circumstances it is preferred not to have to continually pump a dispensing device to push out the dispensed liquid. Thus, aerosols are also well known. Aerosols hold a liquid or other dispensate under pressure such that when a user activates the device (e.g., by pressing a button) the pressurized contents are allowed to escape. However, aerosols present both significant environmental hazards as well as packaging drawbacks, which result from the necessity of using an aerosol propellant in them, and the further necessity of pressurizing them. This requires filling such devices under pressure, using packaging strong enough to withstand the pressure, and taking steps to insure that the propellant maintains a uniform pressure over the life of the can or container. Such conditions often require use of non-environmentally friendly materials and ingredients.

To overcome these drawbacks, what is needed in the art is a spray device that can provide aerosol type functionality without the numerous drawbacks of actual aerosols.

SUMMARY OF THE INVENTION

In exemplary embodiments of the present invention, "Flairosol" dispensing devices can be provided. Such devices utilize a combination of Flair® technology, pre-compression valves and aerosol like pressurization of the dispensed liquid. Such a dispensing device has, for example, a main body comprising a pressure chamber, the latter being provided with a pressure piston and a pressure spring. The device further has a piston and a piston chamber which draws liquid from a container, for example, the inner container of a Flair bottle, and fills the pressure chamber with that liquid as a user operates a trigger in various compression and release strokes. The piston chamber has both an inlet valve and an outlet valve, which serve to prevent backflow. In exemplary embodiments of the present invention, these valves can be combined in a single dome valve. The outlet valve portion of the dome valve allows liquid exiting the piston chamber under pressure (supplied by a user's pumping the trigger) to enter a central vertical channel which is in fluid communication with both the pressure chamber (above the pressure piston) and the membrane valve which leads to the outlet channel and nozzle at the top of the dispensing head. Such an upper outlet valve (e.g., a membrane valve and/or a shuttle valve) can be provided to regulate the strength of the flow and preclude leakage.

In an activation button embodiment, for example, once the liquid is sufficiently pressurized, it can be dispensed by a user releasing the upper outlet valve by pressing on an activation button. In alternate embodiments of the present invention without an activation button, for example, known as "continuous spray" embodiments, once the liquid is sufficiently pressurized, continuous spray occurs until (i) the pressure chamber is emptied or (ii) until the pressure of the liquid in the pressure chamber (including the central vertical channel) falls below the opening pressure of such upper outlet valve. These generally occur at the same time, inasmuch as exemplary systems are designed such that the pressure spring always supplies sufficient force to overcome the upper outlet valve, and thus the upper outlet valve only functions to stop dribbles once the pressure chamber has been emptied of fluid.

BRIEF DESCRIPTION OF DRAWINGS

The patent or application file contains at least one drawing executed in color. Copies of this patent or patent application publication with color drawings will be provided by the (U.S. Patent and Trademark) Office upon request and payment of the necessary fee.

Figure 1:
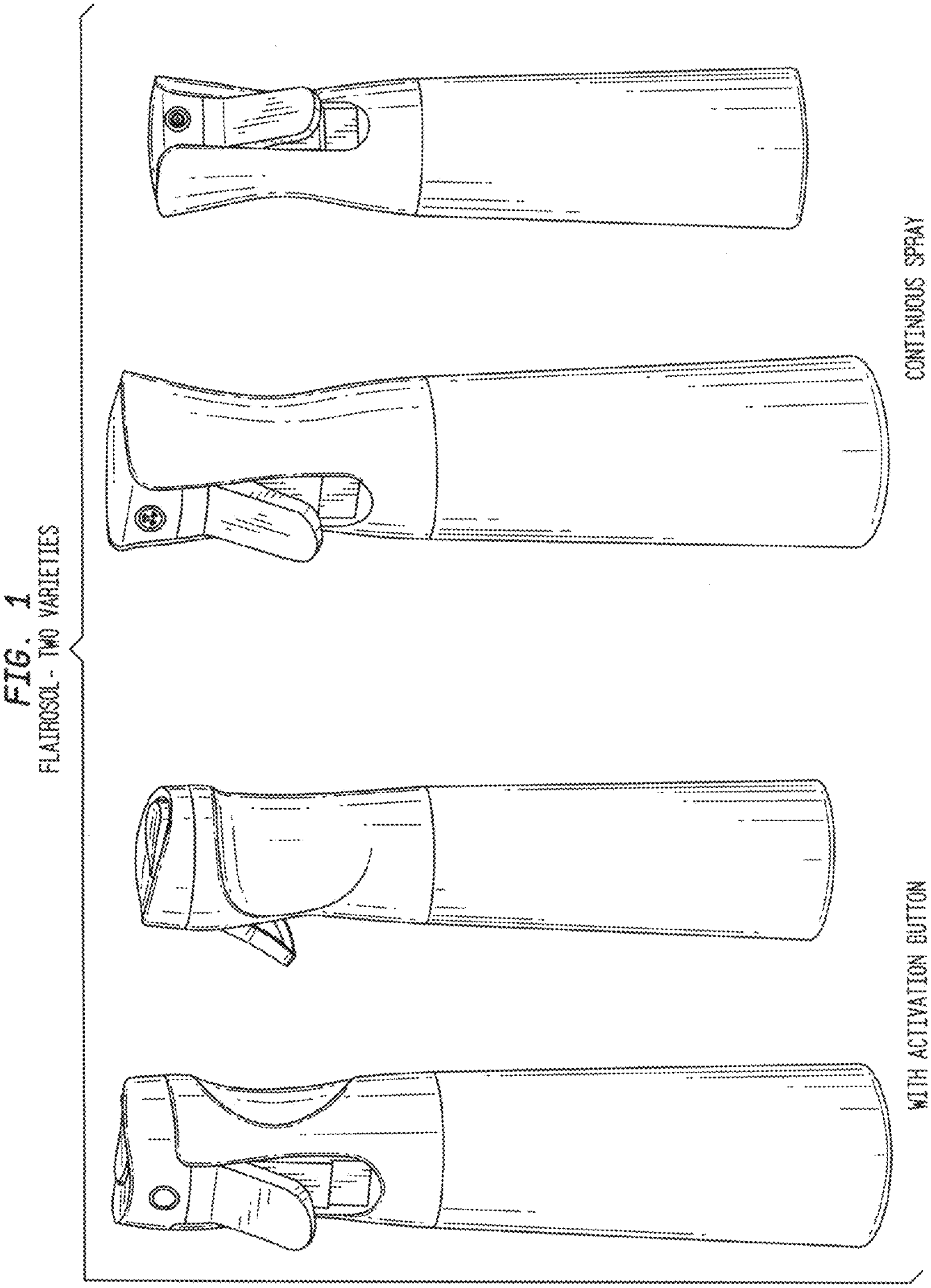
FIG. 1 depicts two exemplary embodiments of a Flairosol device according to the present invention.

It is noted that the U.S. patent or application file contains at least one drawing executed in color (not applicable for PCT application). Copies of this patent or patent application publication with color drawings will be provided by the U.S. Patent Office upon request and payment of the necessary fee.

DETAILED DESCRIPTION OF THE INVENTION

In exemplary embodiments of the present invention, a liquid spraying device offers the benefits of both a liquid sprayer and an aerosol device. Such an exemplary device is referred to herein as a "Flairosol" device, given that it uses the "bag within a bag" Flair® technology developed and provided by Dispensing Technologies B.V. of Helmond, The Netherlands, and combines that technology with means to internally pressurize the liquid prior to spraying so as to emulate aerosol devices.

It is noted that the functionalities described herein could, for example, be implemented without Flair® "bag within a bag" technology, and thus exemplary embodiments of the present invention are not strictly limited thereto. However, such a non-Flair® technology implementation would be more expensive and more cumbersome to produce and use. The "bag within a bag" Flair® technology, which causes the inner container to shrink around the pressure chamber and input tube, and thus obviates headspace in the inner container, obviates the need for a full length dip tube, and also obviates the need to attach the liquid container at the bottom of the unit to prevent crimping and failure to dispense the full contents. Because in Flair® technology the pressure applied to the inner bag results from a displacing medium that is provided between the inner container and the outer container (for example, air), direct venting of the liquid container is not required.

In exemplary embodiments of the present invention, a dispensing device can be provided with an internal pressure chamber. The liquid to be dispensed can be caused to fill the pressure chamber and, as it is filled, push against a pressure piston that is supported by a pressure spring that is provided in the pressure chamber. Thus, when a user pumps liquid into the pressure chamber this liquid pushes on the pressure piston, which loads (compresses) the pressure spring, which puts the liquid in the pressure chamber under pressure in a manner similar to the pressurized contents of an aerosol can. In exemplary embodiments of the present invention such a pressure spring can be a spring in the broadest sense, and thus can be any resilient device which can store potential energy, including, for example, an air or gas shock absorber or spring, a spring of various compositions and materials, and the like. In some exemplary embodiments of the present invention, such pressure in the pressure chamber can, for example, reach approximately three (3)-five (5) bar. In other embodiments it can be 10-20 bar, for example, and in still others, 500-800 milibar, for example. It all depends upon the liquid dispensed, its viscosity, the fineness of spray desired, etc. Further details of the pressure chamber and the pressure spring and its motion are described below in connection with FIG. 3.

Once the liquid is pressurized in the pressure chamber, a user can release an outlet valve and the liquid will spray out. In exemplary embodiments of the present invention, a central channel can be provided above the pressure chamber, and be in fluid communication with both the pressure chamber and an upper outlet valve leading ultimately to a spray nozzle. Because the outlet valve has a minimum "deforming pressure" a certain minimum pressure is required before any liquid can be sprayed, thus providing the consistency of spray and non-leakage features of a pre-compression system. The minimum deforming pressure can, in various exemplary embodiments, be varied by thickness, shape, composition and strength of the valve. In some exemplary embodiments of the present invention the minimum deforming pressure can be low, for example, ½ bar, for a system where the pressure spring varies between 3-5 bar as a function of its minimum and maximum compressions within the pressure chamber, for example. Thus, in such embodiments, while the pressure spring actually controls the outlet pressure of the liquid, once the user releases the activation button, or the pressure chamber is emptied, the upper outlet valve helps bring a "hard stop" to the fluid flow, thus preventing dripping or leaking at the end of a spray. As noted below, because there are two valves operating in concert, one gating entry of the liquid into the pressure chamber (for example a dome valve) and holding it in under pressure, and the other gating outflow or spraying from the upper outlet channel (for example a membrane valve), a variety of different controls for various liquids in various contexts can be implemented.

Details of the invention are next described in connection with FIGS. 1 through 18, in which FIGS. 2-11 depict a first "Activation Button" Flairosol variant, where an activation button must be released to allow the liquid to spray, and where FIGS. 12-18 depict a second "Continuous Spray" Flairosol variant, where once a minimum pressure of the liquid is reached, the liquid sprays continuously until the pressure chamber is emptied. In either variant, Flairosol involves the combination of one or more a pre-compression valve members, a Flair® bottle (inner container and outer container with displacing medium between them) and a pressure chamber that can store mechanical energy in a resilient or spring device.

FIG. 1 shows exemplary form factors of each of such two exemplary versions of Flairosol devices according to exemplary embodiments of the present invention. On the left side an "Activation Button" version is shown, and on the right side, a "Continuous Spray" version is shown. Each version can be used in appropriate contexts, as described more fully below.

A. Flairosol with User Spray Activation/Deactivation

Figure 2:
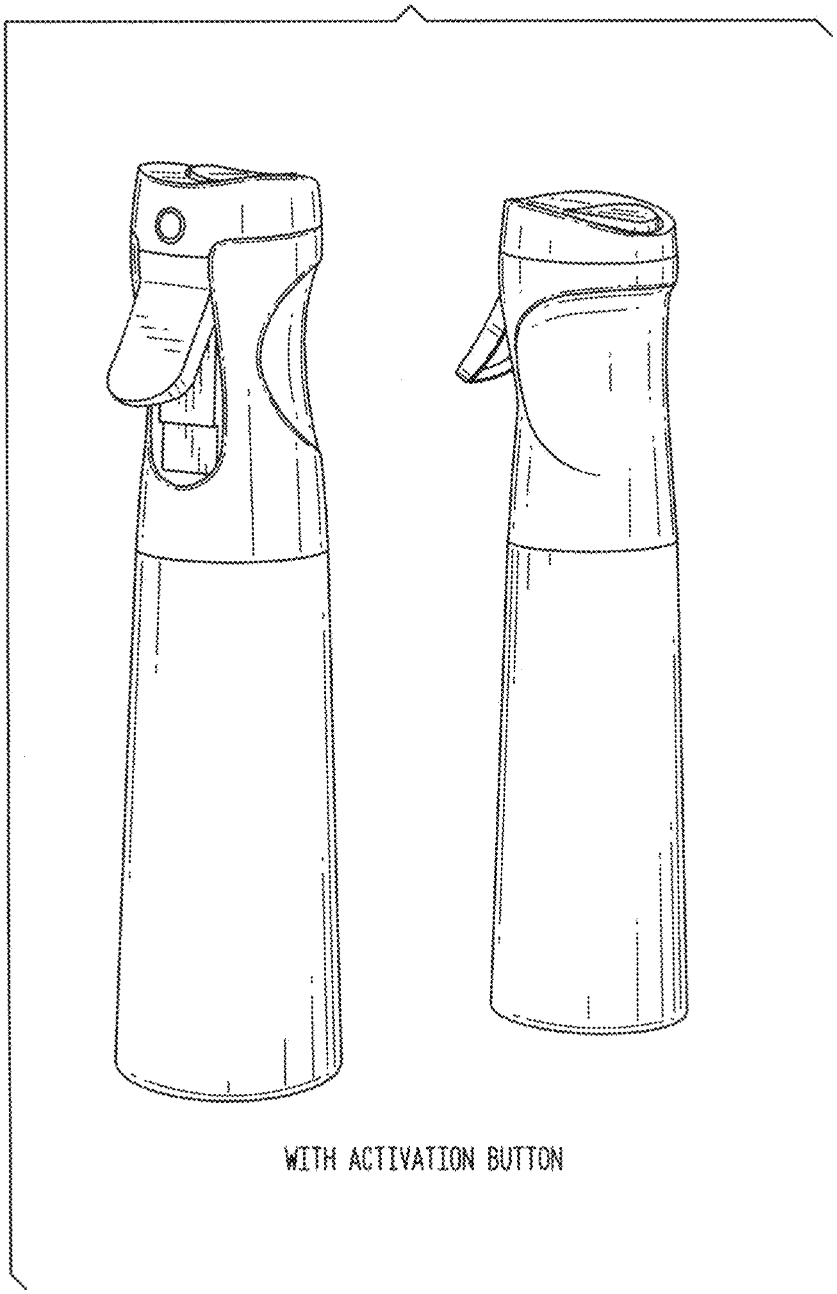
FIG. 2 depicts an exemplary "activation button" embodiment of a Flairosol device according to the present invention.

FIG. 2 depicts an exemplary Flairosol activation button exemplary embodiment. Even if the liquid has been sufficiently pressurized, the activation button version only sprays when a user presses on an activation button, and thus all spraying is under a user's granular control. Here an activation button can be provided on the top of the device, for example. The trigger is used to internally generate pressure on a portion of the liquid in a pressure chamber, thus storing sufficient energy to allow the liquid—once pressurized—to spray out under pressure. Once the liquid in the internal pressure chamber is sufficiently pressurized, a user can press on the activation button which then allows the liquid to spray out of the outlet channel.

Figure 3:
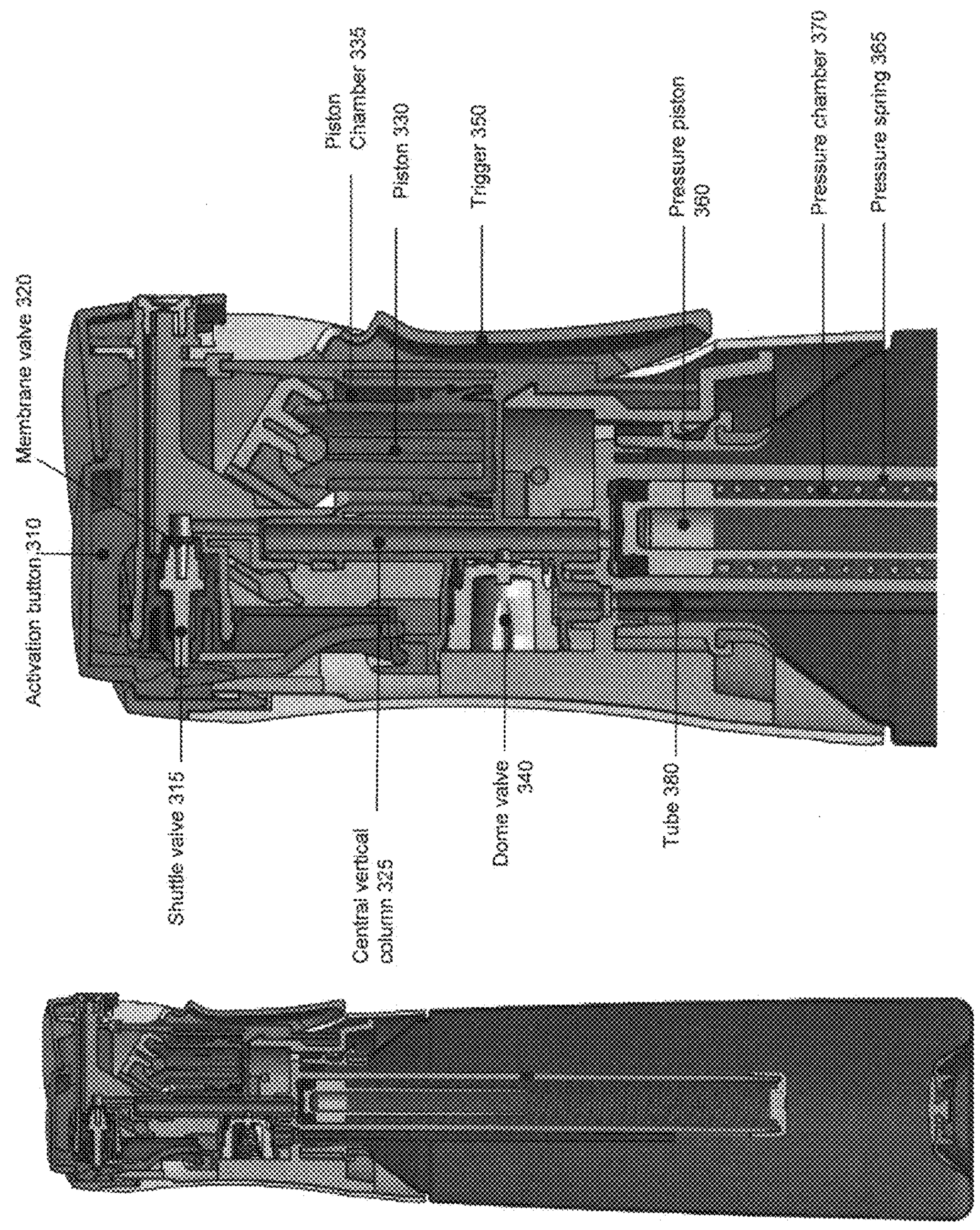
FIG. 3 depicts a longitudinal cross-section and an enlarged upper portion thereof of the exemplary device of FIG. 2.

FIG. 3 shows details of the exemplary activation button Flairosol device of FIG. 2. The device is a combination of a pre-compression sprayer, a Flair® bottle and a pressure chamber/buffer. There is thus shown activation button 310, membrane valve 320, shuttle valve 315, piston 330, piston chamber 335, central vertical channel 325, dome valve 340, trigger 350, pressure piston 360, pressure spring 365, pressure chamber 370 and inlet tube 380. In exemplary embodiments of the present invention, piston 330 can be actuated, for example, by trigger or lever 350, which itself can be connected to the piston 330 by, for example, a pivot arm anchored at a point, or by any other appropriate connecting/transfer of force mechanism. Such operation of trigger 350 pressurizes a portion of the liquid, as described below.

It is noted that piston 330 need not necessarily be oriented vertically as shown, but rather can be oriented in a variety of directions, as may be desirable or needed. For example, instead of having the piston move up to fill the piston chamber and come down to empty it as shown, the reverse could, for example, be done, or various horizontal motions could be implemented, as is commonly done in sprayers. If the reverse vertical orientation is implemented, for example, and the piston thus comes down to fill the piston chamber and moves upwards to empty it, then any air bubbles that are mixed in the liquid can float to the top of the piston chamber in a release stroke (when the piston chamber fills) and be easily purged in the subsequent compression stroke (when the piston chamber empties).

It is noted that the deforming pressure of the valve gating entry into the pressure chamber, for example, dome valve 340, can always be more than the maximum pressure chamber pressure of the container. In this sense, such dome valve, for example, is the ultimate "boss." The dome valve thus has to withstand any pressure developed in the pressure chamber so that liquid does not flow backwards into the piston chamber, for example. It is also noted that such a valve can, for example, be split into two valves, one acting as an inlet valve to the piston chamber and the other acting as a gatekeeper to the pressure chamber/central channel.

It is noted that because liquid is not compressible, as long as there is liquid in the central channel above the pressure chamber, if the pressure spring 365 is still compressed in any way and thus delivering a force, in exemplary embodiments of the present invention, the liquid will flow out of membrane valve 320 if the activation button is pressed. This is because in exemplary embodiments of the present invention pressure chamber 370 can be designed so as to be always shorter than the length of pressure spring 365 at its full extension, with no compression at all. Thus, as long as pressure spring 365 has some compression, it can generate a pressure in excess of the opening pressure of the membrane valve 320. Were this not the case, the pressure piston would never be able to extend to the top position of the pressure chamber and part of the volume of liquid in the pressure chamber would be never be expelled and thus wasted. Although systems can be designed that way within the present invention, it is not an optimal use of resources. Thus, in general, the opening pressure of membrane valve 320 is less important to operation than pressure spring 365.

Thus, pressure spring can be designed, for example, to be always compressed to some degree within the pressure chamber, both at the uppermost position of the pressure piston (pressure chamber empty of liquid), where the force pressure spring delivers is F1, and at the lowermost position of the pressure piston (pressure chamber full of liquid), where the force pressure spring delivers is F2, where F2>F1, and both F1, and F2 are greater than F0 (=no force delivered by the pressure spring, at its maximum length, where there is no compression). In this way the pressure of a liquid being sprayed out of the device will vary linearly somewhere between F2 and F1 as spraying continues. For example, if the pressure spring 365 at its maximum compression within pressure chamber 370 delivers 5 bar, and at its minimum compression within pressure chamber 370 delivers 3 bar, the spray will always vary linearly between 5 and 3 bar. As described below in connection with FIG. 9, an exemplary system does not allow pressure spring 365 to be overcompressed and thus possibly damaged, by means of overflow hole 910.

Figure 4:
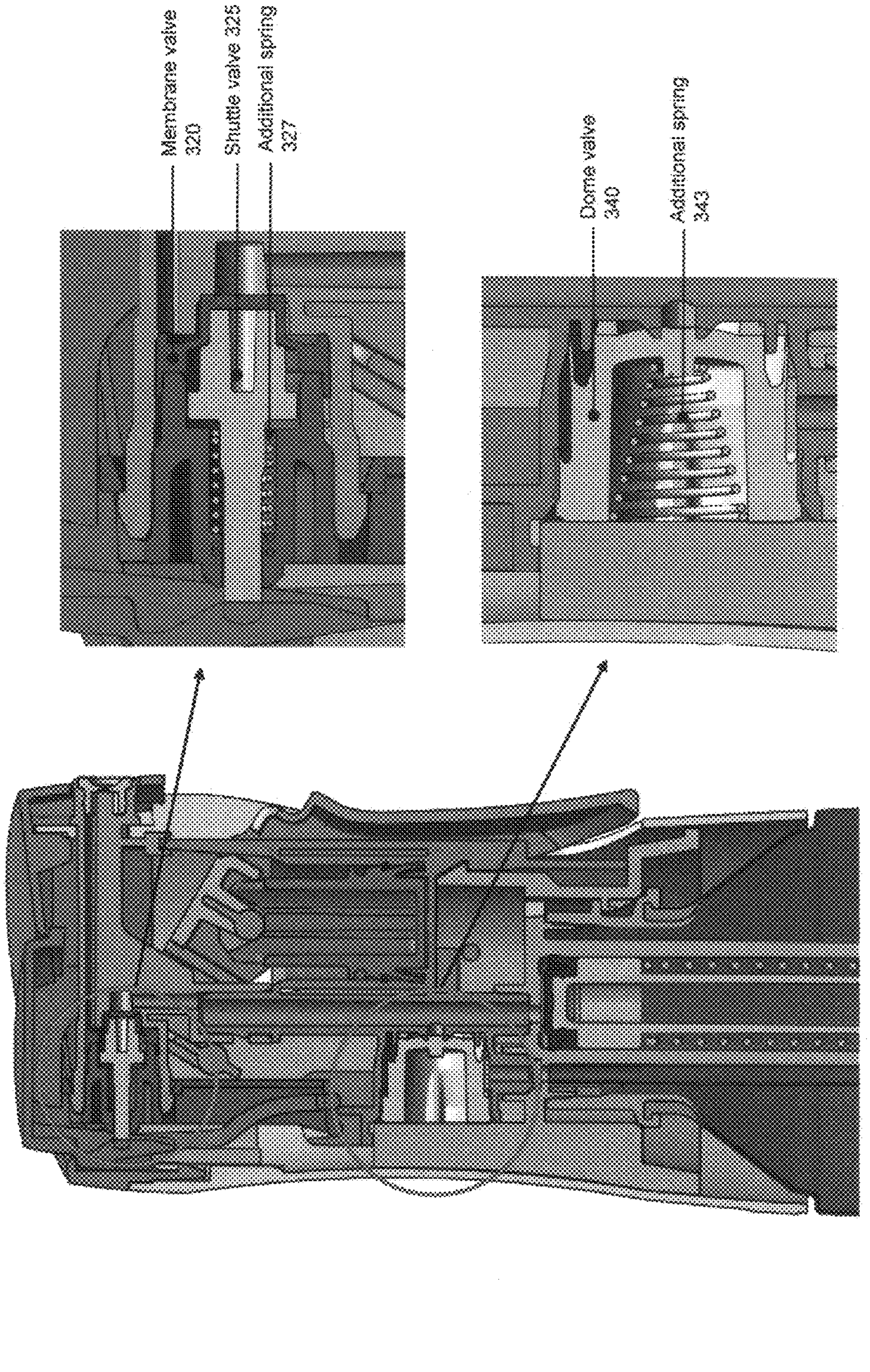
FIG. 4 shows further details and variations of the membrane/shuttle valve assembly and the dome valve in an exemplary Flairosol "activation button" embodiment.

FIG. 4 depicts details of the two valves used in exemplary embodiments of the present invention, a dome valve 340 which regulates entry into the internal piston chamber, and a shuttle valve 325 and membrane valve 320, which together operate as an upper outlet valve, thus gating exit of the liquid into an outflow channel and towards a nozzle. As shown in the right side of FIG. 4, if the generated pressure in the pressure chamber is large (say for a viscous liquid, or for example, where a fine spray mist is desired), dome valve 340 can be strengthened by an additional spring 343. Similarly, additional spring 327 can be added to shuttle valve 325 to increase its opening pressure.

Figure 5:
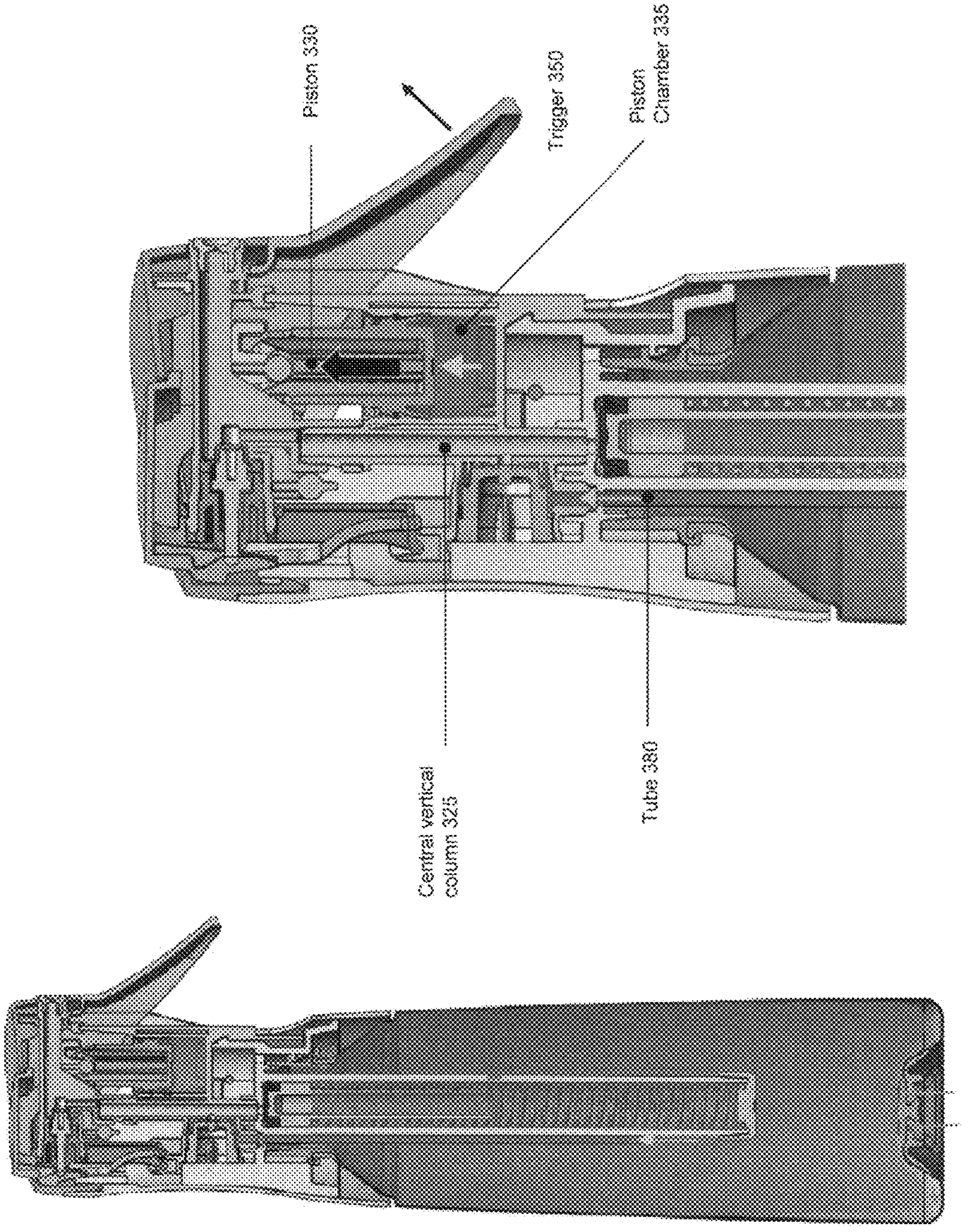
FIGS. 5-6 illustrate an exemplary release or fluid intake stroke of the exemplary Flairosol device of FIG. 2 according to exemplary embodiments of the present invention.

FIG. 5 (left image) shows how the bottle is vented, and how air is sucked in between the two layers of the Flair® bottle as an under-pressure develops in the inner container due to the liquid being drawn up into the piston chamber.

Figure 6:
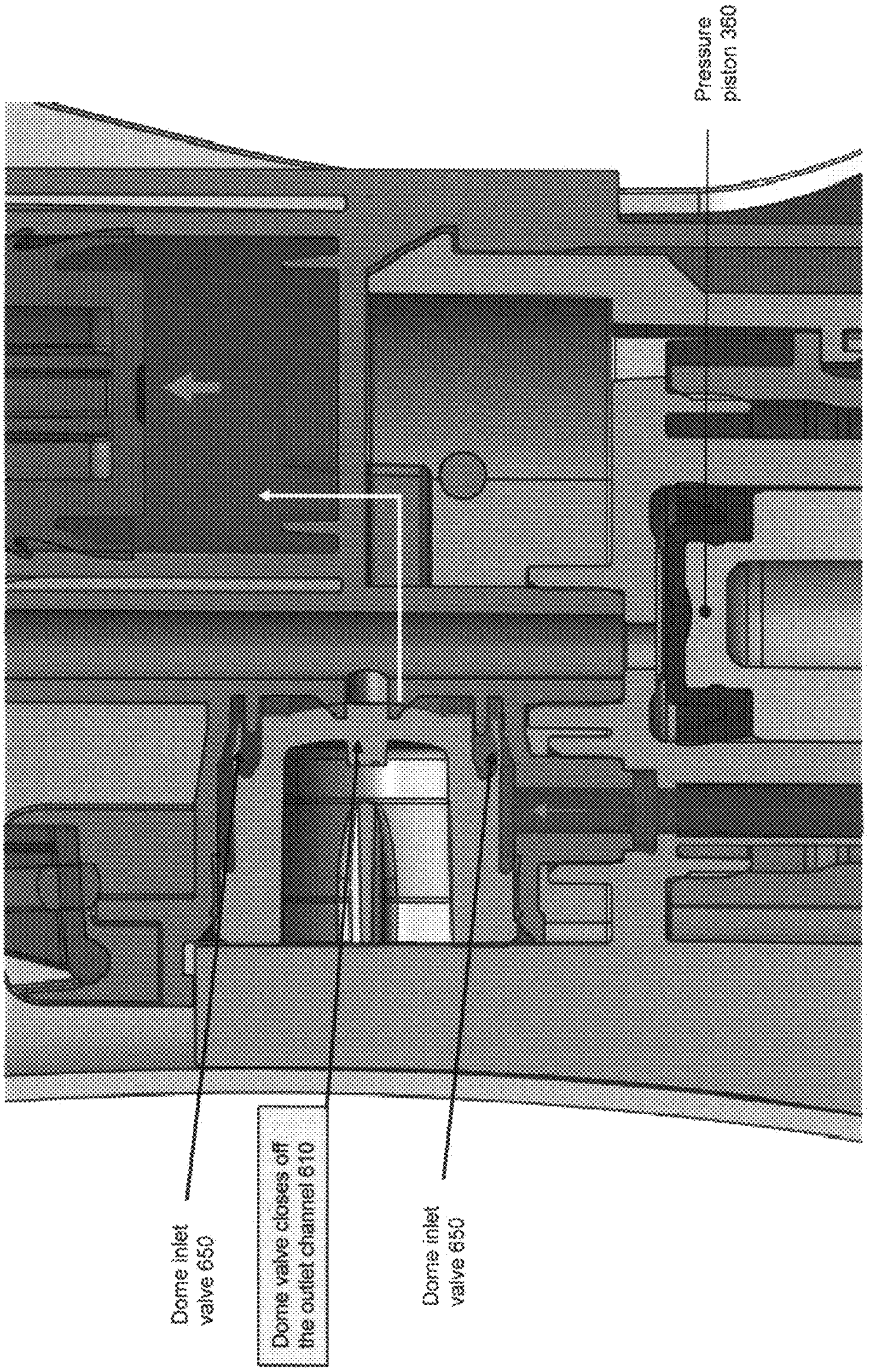

FIGS. 5-6 show an exemplary release or intake stroke of the exemplary Flairosol device of FIG. 3. The right image of FIG. 5, and a magnification of it shown in FIG. 6, depict details of the piston chamber 335, piston 330 and fluid path in such a release stroke. The trigger 350 can be spring loaded (plastic integrated spring) as in a standard sprayer. When the trigger is moved outward (see black arrow on right image in FIG. 5) the piston moves upwards and away from the device, and liquid is sucked into the piston chamber, as shown by the arrows in the center of FIG. 6 running from near dome valve 340 to piston chamber 335. The actual liquid flow path lies behind the central vertical channel 325 leading to the outlet channel at the top of the device, and thus is not shown in FIG. 6. As shown at 610, the liquid passes the inlet valve 650 of the dome valve (see top and bottom right of the dome valve), and then passes through a channel (not shown) into piston chamber 335. It is noted that because the liquid being drawn up into the piston chamber in this release stroke is not pressurized (inasmuch as it comes from the body of the inner container or bottle and not the pressure chamber), it is unable to overcome the dome valve seal and proceed into the outlet channel. Thus, the dome valve closes off the outlet channel, as shown at 610.

Figure 7:
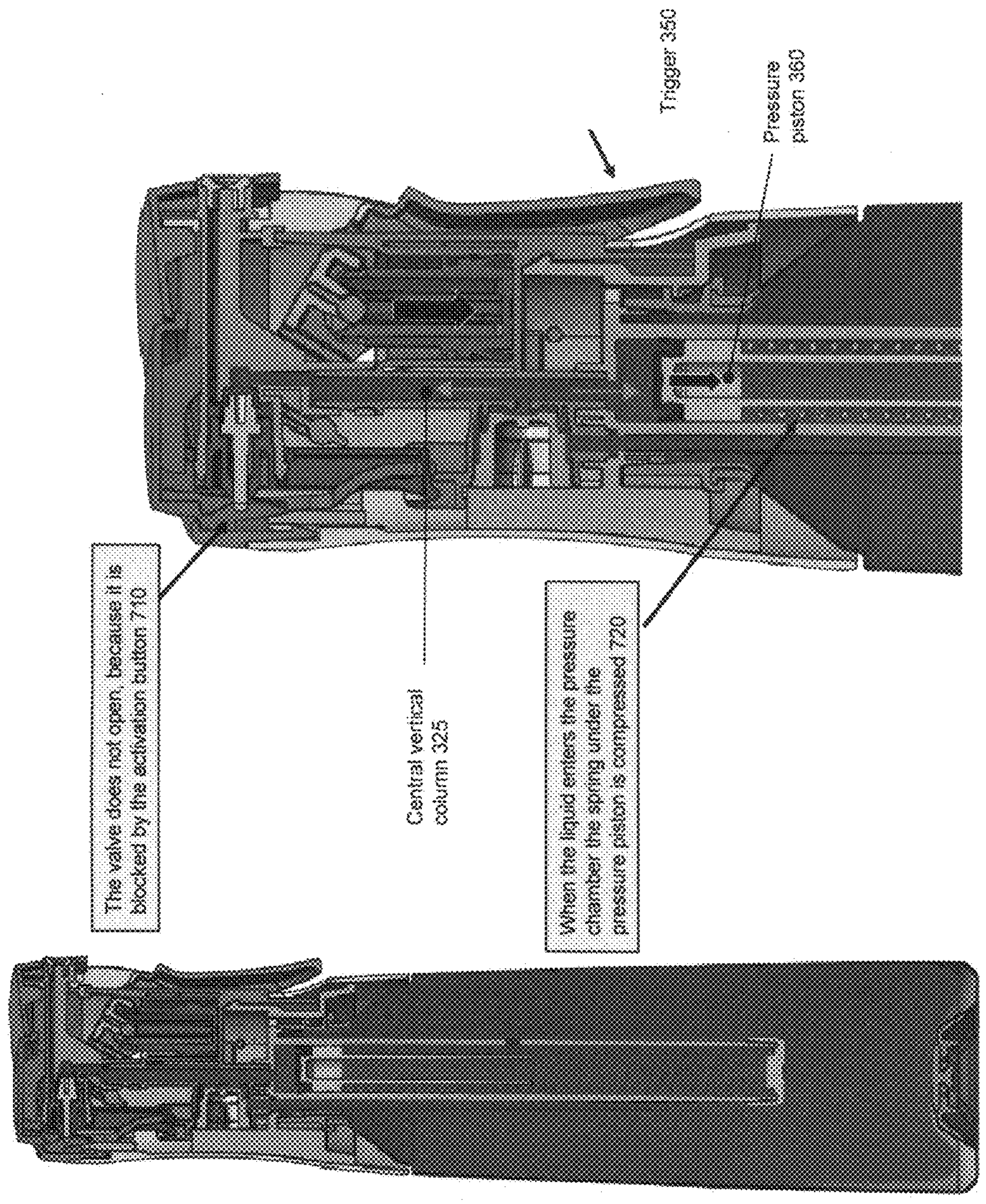
FIGS. 7-8 illustrate a subsequent compression or fluid outflow into pressure chamber stroke of the exemplary Flairosol device of FIG. 3 according to exemplary embodiments of the present invention.
Figure 8:
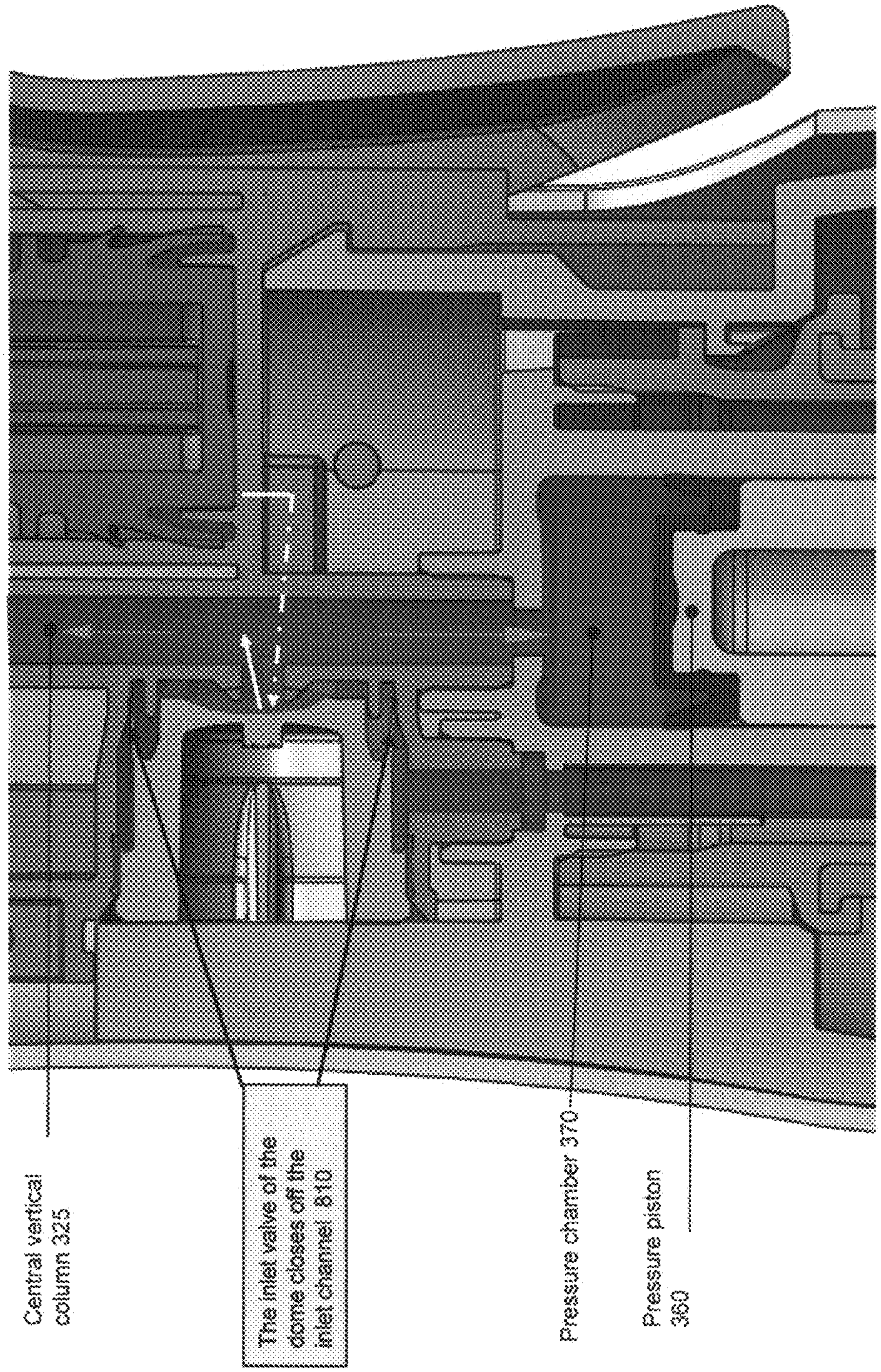

FIGS. 7-8 illustrate an exemplary compression stroke of the exemplary Flairosol device of FIG. 3 according to exemplary embodiments of the present invention. A user pushes down on trigger 350, causing the piston chamber to empty, and forcing the liquid downwards and out of it, towards the dome valve. Here the liquid is forced back through the same channel by which it entered the piston chamber, shown again by the dashed arrow line in the center of FIG. 8. It is noted that multiple channels can be used as well, for example, for safety reasons. The inlet valve of the dome valve prevents the liquid from going back into the bottle through the uptake line, as shown in FIG. 8 at 810, but now, inasmuch as the liquid is pressurized, the dome valve flexes open because of the liquid's pressure, now allowing the liquid to both enter the pressure chamber below, and move up into the central channel towards the membrane valve above, as shown in FIG. 8. At the top of the device, as shown at 710 in FIG. 7, the pressurized liquid is blocked by the activation button holding the membrane valve shut. When the liquid enters the pressure chamber, the spring under the pressure piston is thus compressed, as shown at 720, in the right image of FIG. 7.

Figure 9:
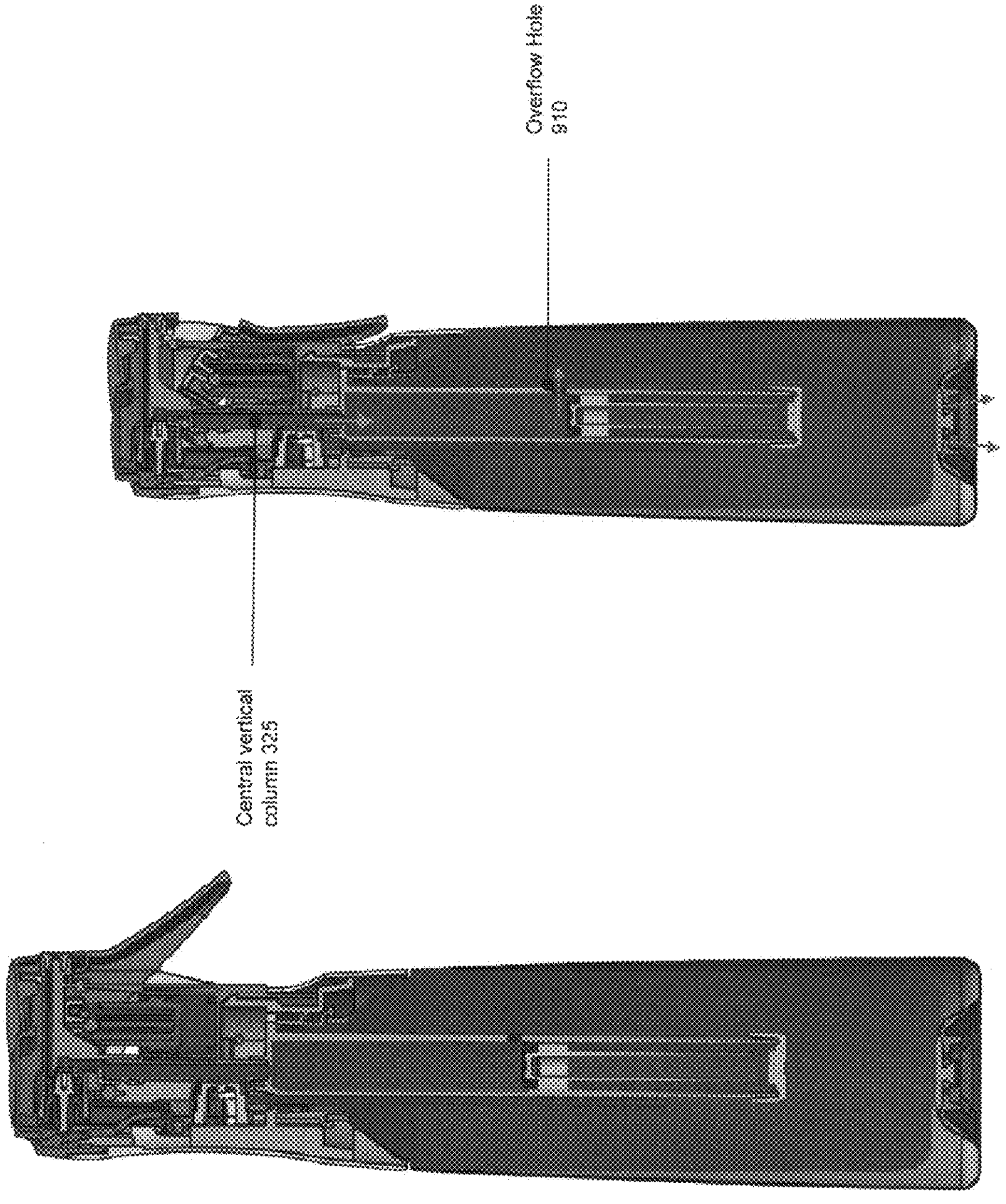
FIG. 9 illustrates the exemplary Flairosol device of FIG. 3 with a completely filled pressure chamber and the spring under the pressure piston being compressed to its lowermost position, according to exemplary embodiments of the present invention.

FIG. 9 illustrates the exemplary Flairosol device of FIG. 3 with a completely filled pressure chamber and the spring under the pressure piston being at its maximally compressed state (as defined by the design—obviously the shown spring could be compressed even further), according to exemplary embodiments of the present invention. It is noted that as the pressure chamber is filled, because of an under pressure thus created in the (inner) Flair® bottle, air is sucked in between the Flair® layers (venting) as shown at the bottom of FIG. 5 (left image), inasmuch as the space between the outer surface of the inner Flair® bottle, and the inner surface of the outer Flair® bottle (said space shown in light blue in FIG. 9), is open to ambient pressure via this venting.

Returning to FIG. 9, if the trigger is still pulled by a user after the pressure chamber has been completely filled, the liquid pushed by the piston is put back into the bottle through an overflow hole 910 that is placed right at the normal bottom position (maximally compressed pressure spring) of the pressure piston in the pressure chamber. Thus, if the pressure spring is pushed even farther downwards, the pressure piston temporarily drops below the overflow hole, and the additional liquid pushed into the pressure chamber will then exit back into the container due to the overflow, as shown in the right side of FIG. 9. This is a safety feature to prevent over-compression and compromising of the pressure spring 365. Additionally, any slight over-pressure of air between the containers can be pushed out between the two layers of the container, as shown by the light blue arrows at the bottom of FIG. 9, right image.

In the situation of FIG. 9 when the pressure piston rises to cover the overflow hole 910, the liquid in the pressure chamber is now under pressure because of the compressed spring under the pressure piston. In this configuration the liquid cannot return into the bottle because this is closed off by the inlet valve portion of the dome valve. Similarly, the liquid cannot yet pass to the outlet channel and through the orifice because the activation valve is closed by the activation button. This is because when the activation button is released, the shuttle valve is locked and the liquid cannot pass to the nozzle or outlet channel. User action is thus needed to spray.

Figure 10:
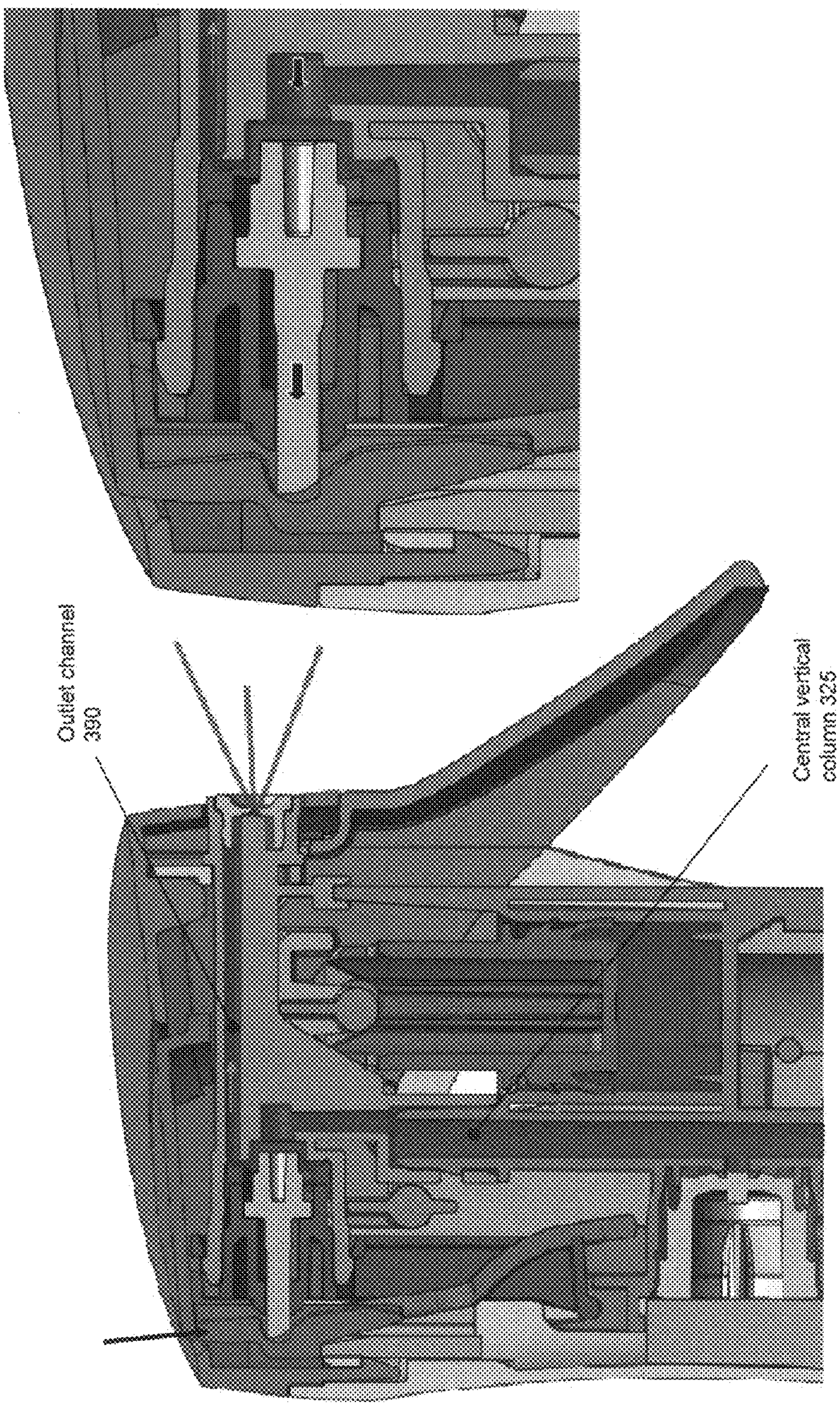
FIG. 10 shows the exemplary Flairosol device of FIG. 2 once the activation button has been pushed, the membrane valve thus released, and spraying has begun according to exemplary embodiments of the present invention.

FIG. 10 shows the exemplary Flairosol device of FIG. 3 once the user has pushed down on activation button 310 (as shown by the direction of the black arrow) in the left image, the lock on the membrane valve thus released, and spraying has begun according to exemplary embodiments of the present invention. When the activation button 310 is pushed, the shuttle valve is unlocked. As a result, the only bar to the exit of the liquid is its being at a minimum pressure to overcome the membrane valve (and, if implemented, an extra spring behind the shuttle valve as shown in FIG. 4). If so, the liquid deforms the membrane valve (overcoming its opening pressure) and pushes the shuttle valve backwards, and thus liquid can pass through outlet channel 390 towards the nozzle, as shown in FIG. 10, and in particular, the right image of FIG. 10. As noted, the opening pressure of the membrane+shuttle valve combination can be increased by adding an additional spring as shown in FIG. 4, for example, or by otherwise increasing the opening pressure of these structures, as may be needed for high pressure applications, such as viscous liquids or fine mist spraying, as noted above (the higher the pressure of the liquid, the finer the mist).

Figure 11:
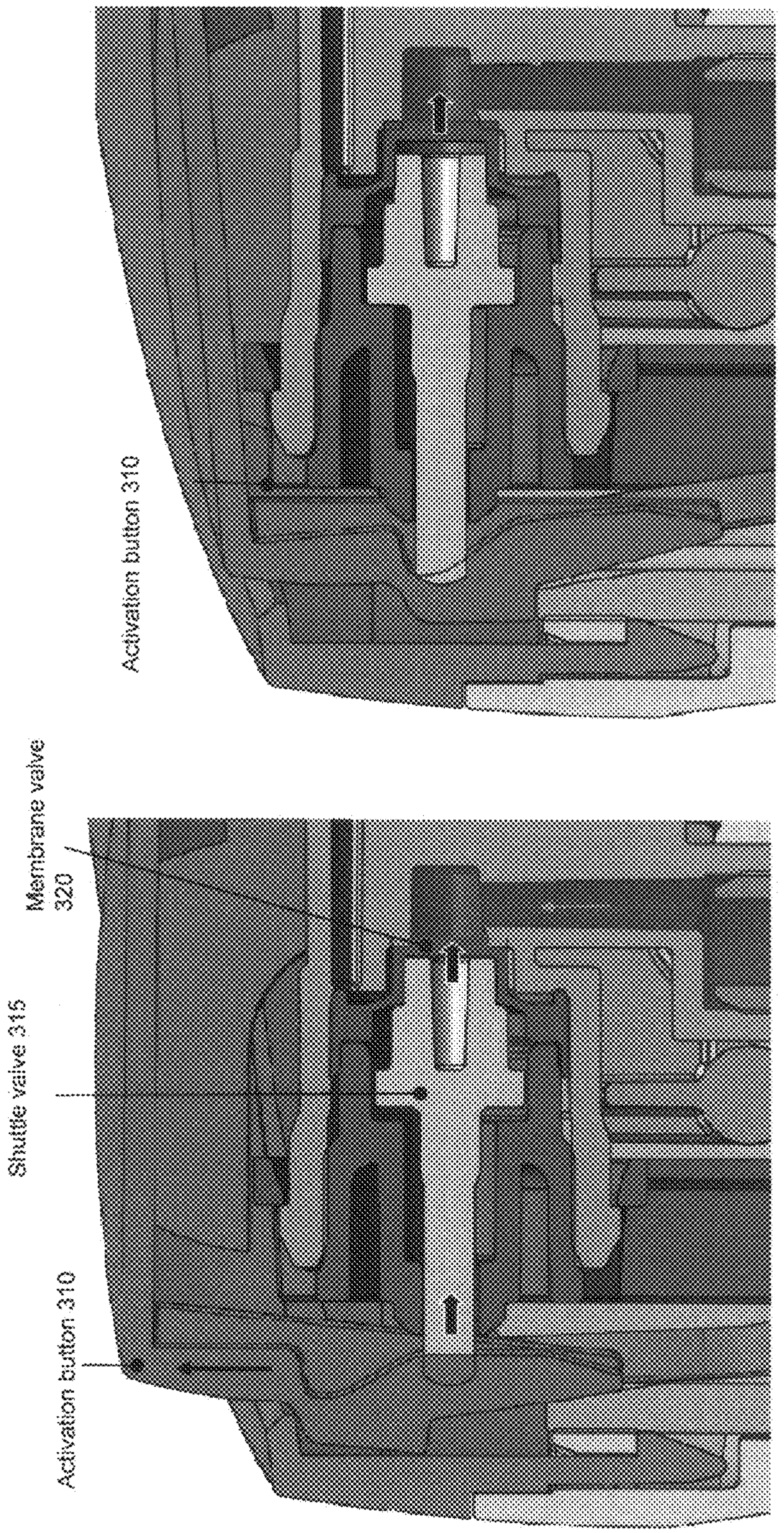
FIG. 11 shows the exemplary Flairosol device of FIG. 2 where spraying has stopped; either the activation button has been released (left panel), or the liquid pressure drops below the membrane valve opening pressure (right panel), thus stopping spraying according to exemplary embodiments of the present invention.

FIG. 11 illustrates a user stopping spraying according to exemplary embodiments of the present invention. To prevent dripping, the liquid has to be shut off very suddenly. Thus, if the liquid pressure is too low to create a good spray, the membrane valve deforms to its original state and blocks the liquid. Thus, the outlet valve immediately closes when the activation button 310 is released by a user, as shown in the left side of FIG. 11. Alternatively, even if not released, when the liquid pressure in the central vertical channel is too low to open the outlet valve, such as, for example, if the user has let the entire pressure chamber empty, as shown in the right side of FIG. 11.

In general, the opening pressure of the dome or equivalent valve that gates entry to the central vertical channel in the valve body will be higher than either (i) the opening pressure of the shuttle or other outlet channel valve, and also higher than (ii) the maximum pressure developed in the pressure chamber (at the lowest position of the pressure piston, corresponding to force F2 being delivered by the pressure spring. This keeps pressurized liquid within the central channel and the pressure chamber while it is not being sprayed out. Thus, it is understood that various choices for (i) opening pressure of the dome valve (or other pressure chamber/central channel inlet valve); (ii) maximum pressure of the pressure spring at its lowermost allowed position; and (iii) the opening pressure of the shuttle+membrane valve (or other upper outlet valve), can be used in various exemplary embodiments of the present invention depending upon the particular application, the viscosity of the liquid to be dispensed, the desired volume of the pressure chamber and thus desired length of spraying time, the desired outlet pressure and fineness of mist or spray, etc. There are thus many variables that can thus be used to deliver a wide range of Flairosol devices for various commercially desirable products and applications.

B. Flairosol Continuous Spray

Figure 12:
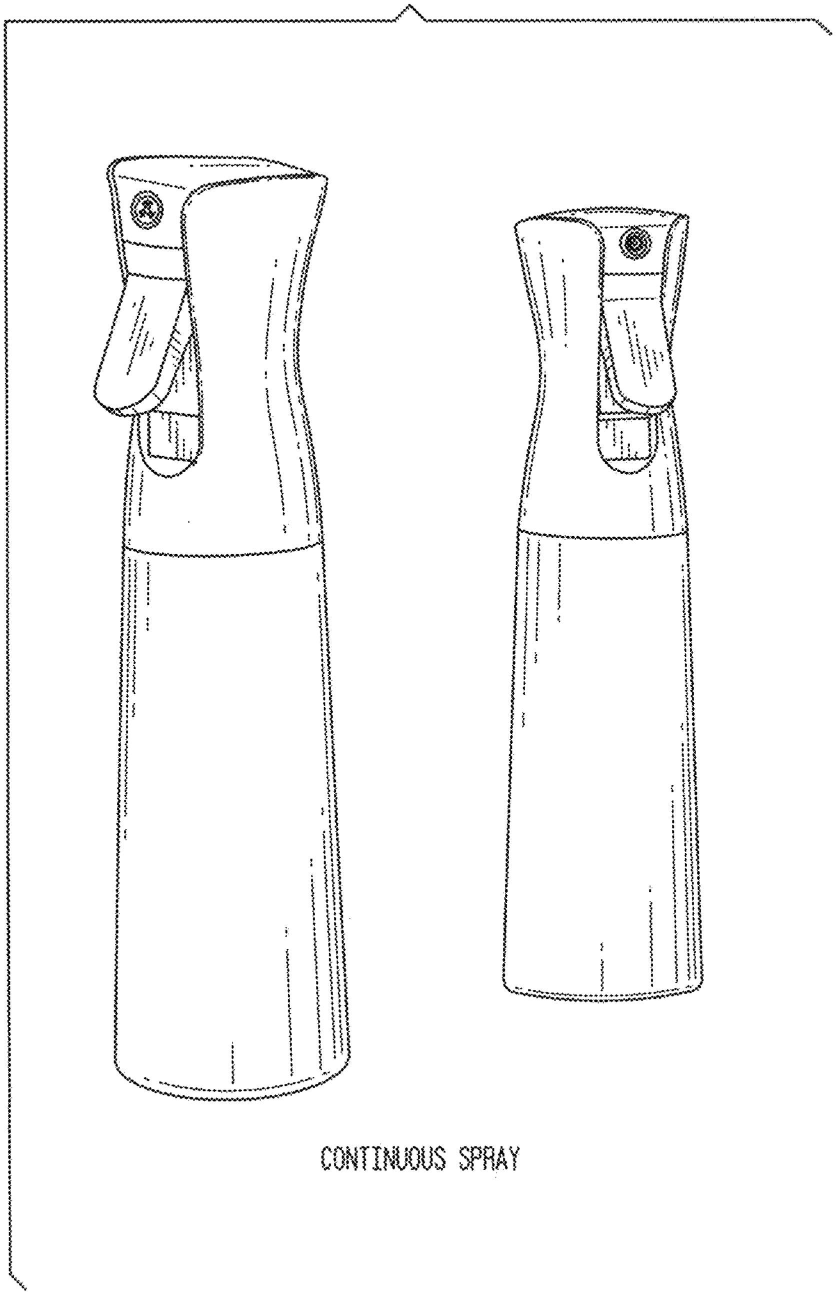
FIG. 12 depicts exemplary Flairosol "continuous spray" embodiments according to exemplary embodiments of the present invention.

FIGS. 12-18 depict a Flairosol continuous spray embodiment according to exemplary embodiments of the present invention, as next described. FIG. 12 shows exemplary continuous spray Flairosol devices from the outside. It is noted that there is only a trigger for a user to pump, but no activation button (compare with FIG. 2, or left side images of FIG. 1).

Figure 13:
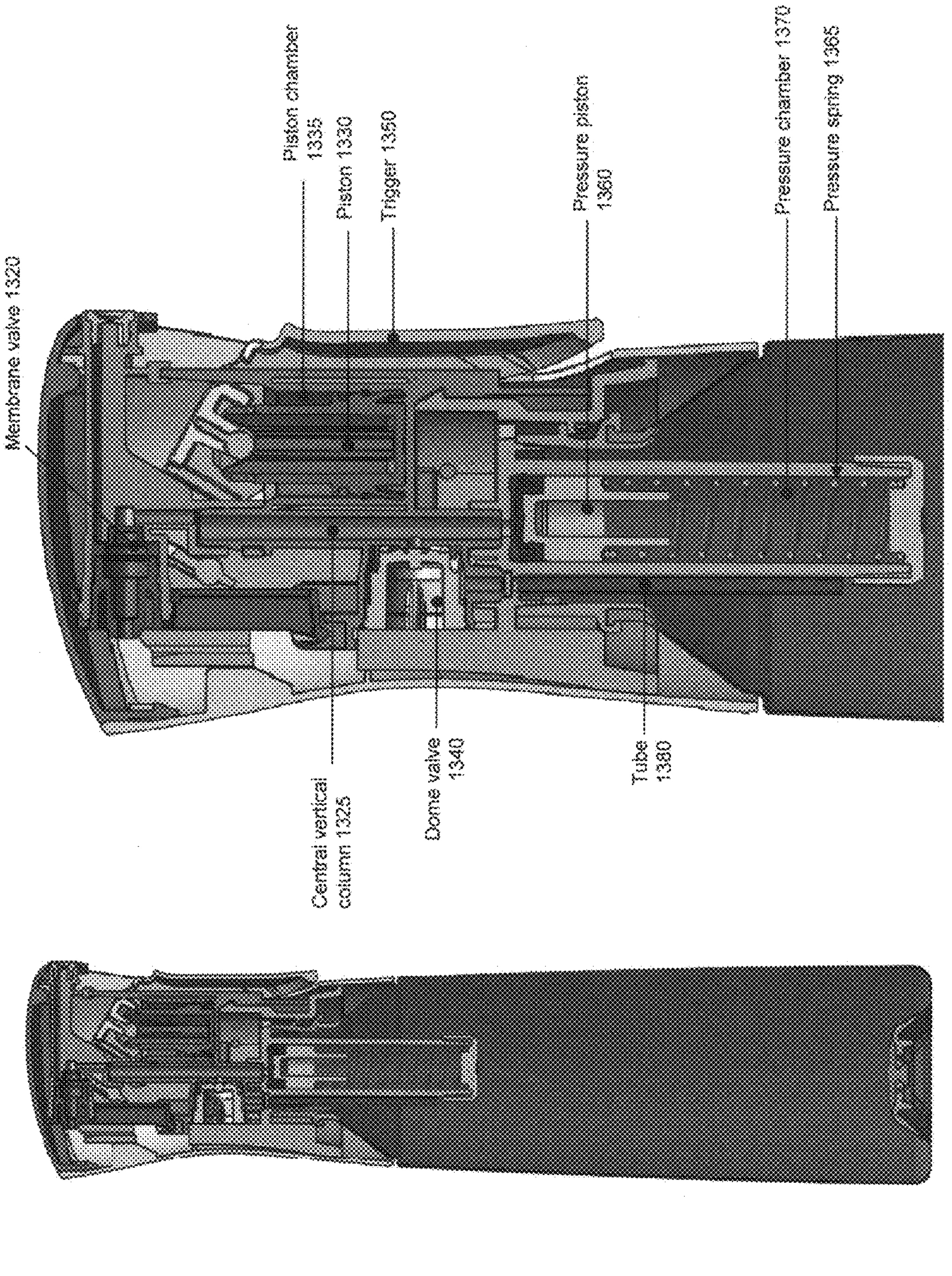
FIG. 13 depicts a longitudinal cross-section and an enlarged upper portion thereof of the exemplary Flairosol "continuous spray" device of FIG. 12.

FIG. 13 is analogous to FIG. 3, discussed above. FIG. 3 depicts how the main principle is the same for both exemplary Flairosol systems, i.e., activation button and continuous spray: The main differences between the two embodiments are, as noted, that no activation button is needed for the continuous spray Flairosol version. It is also noted that an outlet valve is obviously needed in both versions, such as membrane valve 1320 of FIG. 13, but that in the continuous spray embodiment it has no end pin or shuttle valve by which it can be locked prior to the pressure chamber being emptied. If the pressure of the pressurized liquid is high enough, as described below, a membrane valve, or other valve, such as, for example, a spring loaded valve, at the top of the central vertical channel opens and the liquid passes out the outlet channel. Additionally, for the continuous spray version, the pressure chamber can be made smaller, for example, so that once a user stops pumping the trigger a defined and controlled amount of liquid will spray out of the bottle.

There is thus shown in FIG. 13 membrane valve 1320, piston chamber 1335, piston 1330, central vertical channel 1325, dome valve 1340, trigger 1350, pressure piston 1360, pressure spring 1365, pressure chamber 1370 and inlet tube 1380. In exemplary embodiments of the present invention, piston 1330 can be actuated, for example, by trigger or lever

1350, which itself can be connected to piston 1330 by, for example, a pivot arm anchored at a point, or any other appropriate mechanism. Such operation of the trigger or lever 1350 pressurizes a portion of the liquid, in the same way as is described above for the activation button version of Flairosol.

Figure 14:
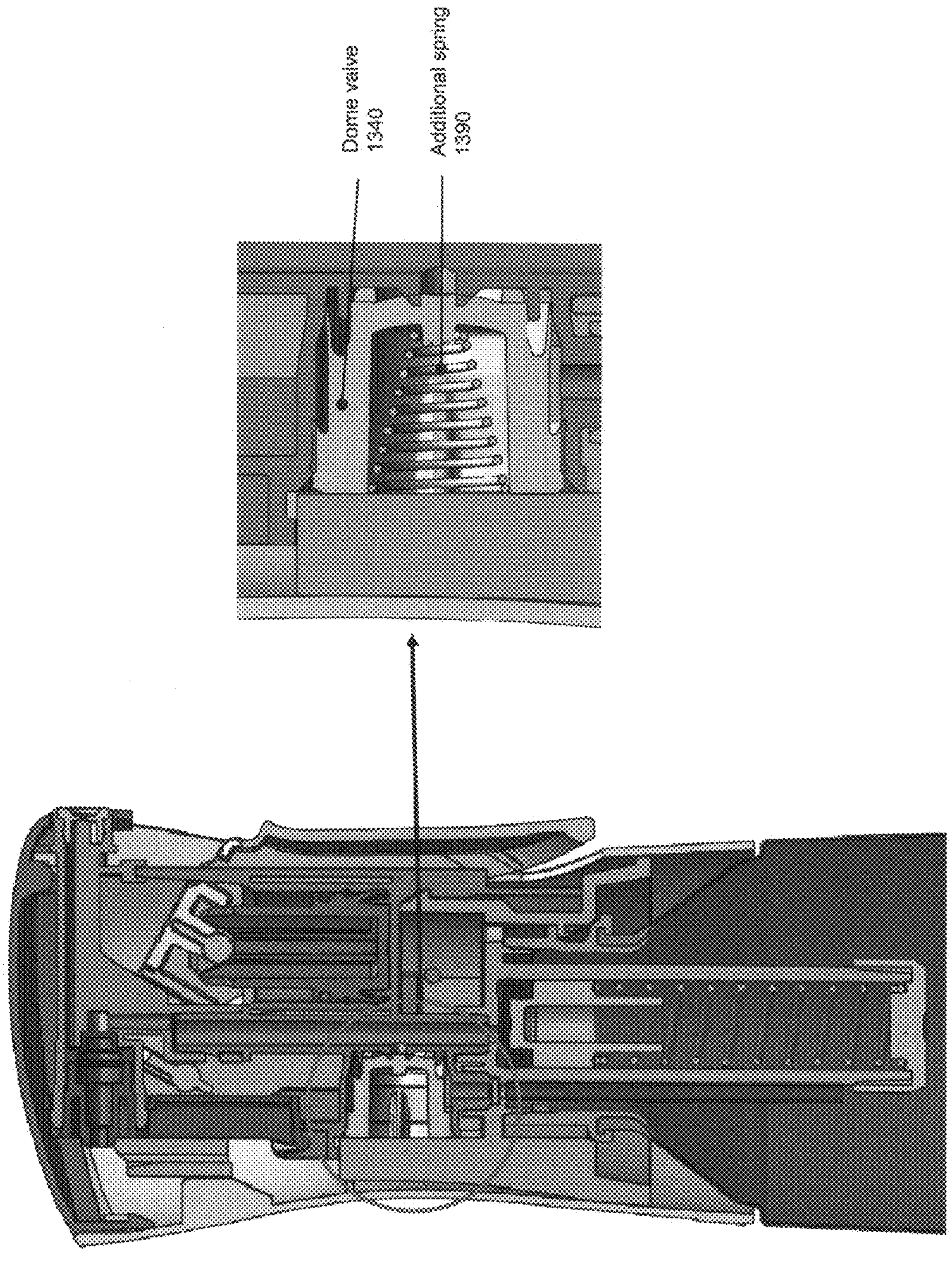
FIG. 14 shows further details and variations of the exemplary Flairosol continuous spray embodiment of FIG. 13.

FIG. 14, analogous to FIG. 4 shows how an additional spring 1390 or other bolstering device can be added to dome valve 1340.

Figure 15:
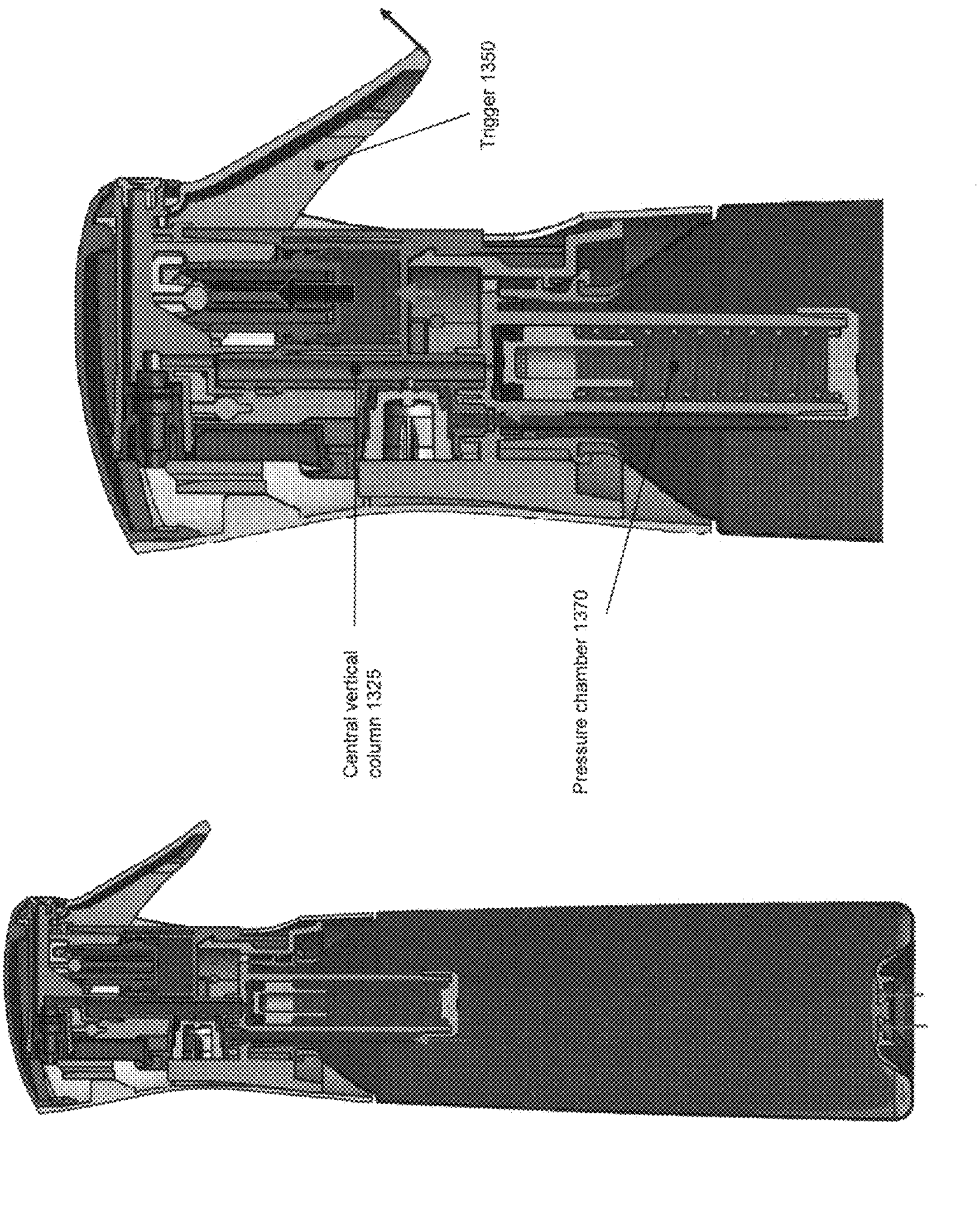
FIG. 15 shows an initial release or fluid intake stroke of the exemplary Flairosol continuous spray device of FIG. 13 according to exemplary embodiments of the present invention.

FIG. 15 depicts an exemplary release stroke of this exemplary continuous spray embodiment. With reference thereto, when trigger 1350, which can be, for example, spring loaded, for example, using an integrated plastic spring, moves forward, liquid is thus sucked into the piston chamber, as described above in connection with FIG. 5. Moreover, as shown in the left panel of FIG. 15, at the bottom of the container the Flair® bottle is vented, so air can be sucked in between the two layers of the Flair® bottle as an underpressure develops in the inner container due to the liquid being drawn up into the piston chamber. At this initial release stroke, both pressure chamber 1370 and central vertical channel 1325 have no liquid in them.

Figure 16:
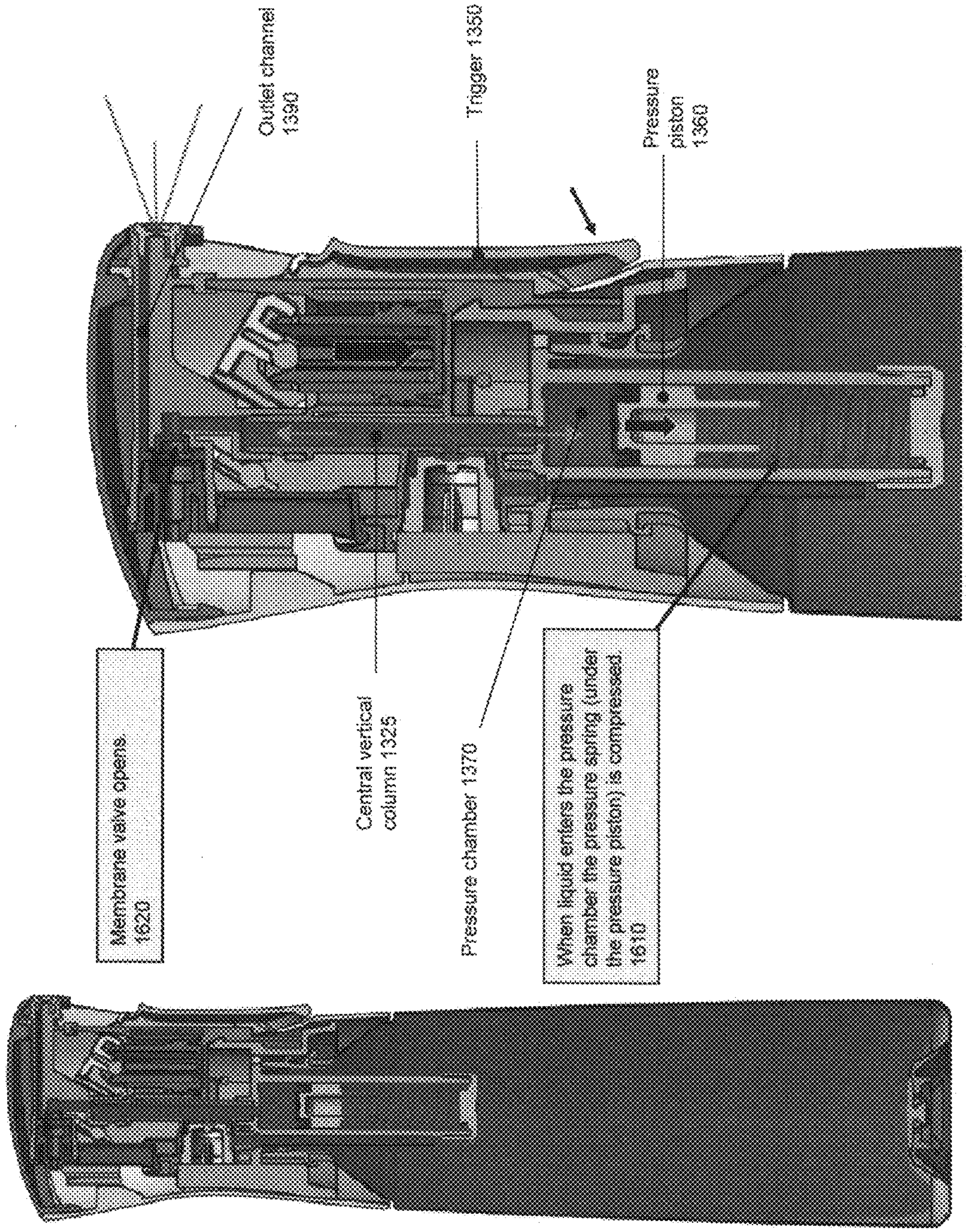
FIG. 16 illustrates a subsequent compression or outflow of fluid into pressure chamber stroke of the exemplary Flairosol device of FIG. 13 according to exemplary embodiments of the present invention where continuous spraying has also begun.

In FIG. 16 a subsequent compression stroke is shown. Here, as a user pushes down on trigger 1350, liquid is pushed out of piston chamber 1335 and past a normally closed dome valve 1340, which it opens, and through the now open orifice (upon which dome valve 1340 is normally seated) both upwards into central vertical channel 1325 and downwards into pressure chamber 1370. When the liquid enters pressure chamber 1370, pressure spring 1365, under pressure piston 1360, is compressed, as shown at 1610. The liquid inside the piston chamber is pushed past the dome valve into the pressure chamber, as noted, AND from the central vertical channel 1325 past the membrane valve 1320 to the outlet channel 1390 and the nozzle, as shown at 1620, there being no activation button interaction needed to enable outlet flow. Spray will continue until the pressure chamber is emptied.

Figure 17:
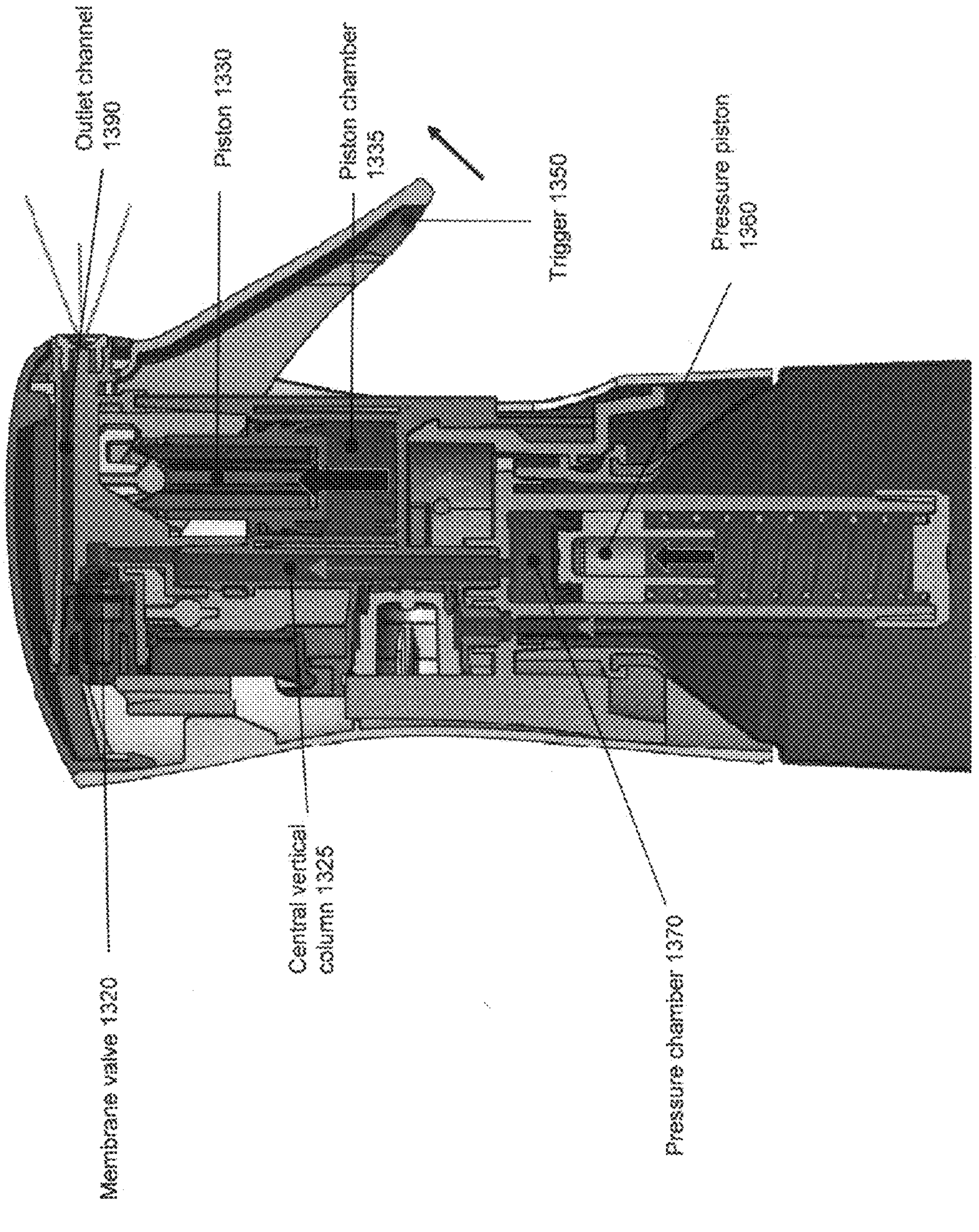
FIG. 17 illustrates a consecutive release stroke of the exemplary Flairosol device of FIG. 13, where the liquid is pushed out of the pressure chamber through the orifice and liquid is also taken into the piston chamber.

FIG. 17 shows a subsequent release stroke, during which the now pressurized liquid within central channel 1325 (above pressure chamber 1370) is still being pushed out through the nozzle, as described just above. During this consecutive release stroke, the liquid is pushed out of the pressure chamber through the orifice and the liquid is also sucked into piston chamber 1335 as trigger 1350 moves outward and piston chamber 1335 fills with liquid from the container, as described above. In this way a user can keep spraying by performing less strokes, and as described below, if the input volume is properly set in relation to the output volume, a continuous spray can be maintained for as long as a user desires.

Figure 18:
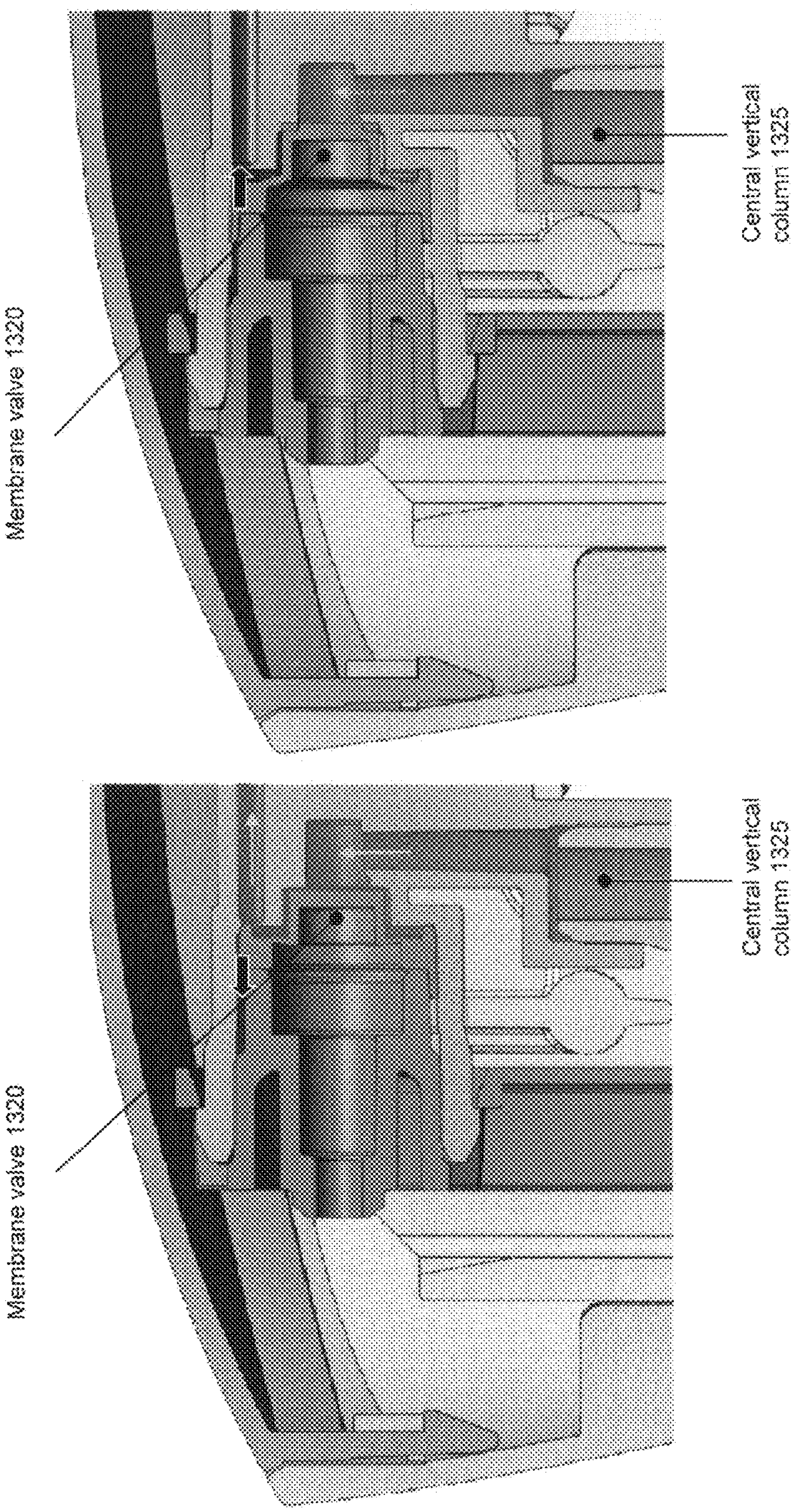
FIG. 18 depicts stopping of spraying in an exemplary Flairosol continuous spray type device according to exemplary embodiments of the present invention, where once the liquid pressure is too low to create a good spray, the membrane valve deforms to its original state and blocks the liquid.

FIG. 18 depicts stopping of spraying in an exemplary Flairosol continuous spray type device according to exemplary embodiments of the present invention. In the left panel the liquid moves up through central vertical column 1325 and sprays from the nozzle, because membrane valve 1320 is open due to sufficient liquid pressure. As shown in the right panel, once the liquid pressure in central vertical column 1325 is too low to create a good spray, membrane valve 1320 closes.

In exemplary embodiments of the present invention, by designing the volume of the piston chamber to be larger than that of the pressure chamber, a user can keep the Flairosol device spraying while making only a few strokes, as each pumping stroke is more than sufficient to replenish the pressure chamber, and thus there is always a pressure in the pressure chamber high enough for spraying. When a user stops making pumping strokes with the trigger, the membrane valve closes as soon as the pressure drops, due to the precompression requirement of this valve. This prevents dripping, and insures that when liquid is sprayed it has a minimum speed and thus a relatively narrow distribution of speeds for all the particles being sprayed, as is the case for all precompression systems.

As noted, for a given nozzle size and throughput, by adjusting the size of the pressure chamber relative to the size of the piston chamber, the output rate of the sprayer can be set to be less than the input rate. This insures that as long as a user keeps pumping the trigger, the sprayer will continuously spray. For example, if the output is set to 0.7 cc per second (this is a function of, inter alia, nozzle diameter and swirl chamber length, etc.), and the input is set at 1.6 cc per stroke (volume of piston chamber), a user who pumps one stroke every 2.2 seconds, will always be "ahead" of the spray output, and need not rush to keep the pressure chamber filled. Various volumes and relative volumes of piston chamber and pressure chamber can be used as may be appropriate given the application and context.

Alternatively, for example, if the application is such that a semi-continuous spray is desired, where one wants to make sure the user really intends to keep spraying, such as when using very costly, or very dangerous liquids, the reverse can be implemented, and the input can be set to be less than the output volume. In this case the input will always be "behind" the spray output, and a user will have to intentionally keep pumping in order to keep the pressure chamber filled.

Additionally, it is understood that once a user stops pumping the trigger, spray continues until either the pressure chamber has fully emptied, or the potential energy in the spring under the pressure piston has dissipated such that the pressure in the pressure chamber is less than the outlet valve opening pressure. Thus, at a given flow rate, and a given size of pressure chamber, the Flairosol sprayer will continue to spray for some time. This can be adjusted to be longer or shorter depending upon the application, by adjusting the relative sizes of the piston chamber and the pressure chamber, as noted, for a constant nozzle output. As will thus be appreciated, the Flairosol technology converts discrete input pump strokes to a continuous spray, by means of a liquid buffer—the pressure chamber. By properly adjusting the relative volumes, as noted, continuous spray can be maintained with relatively few pump strokes, and they need not be absolutely regularly spaced, given the liquid buffer (i.e., pressure chamber plus central vertical channel). This makes for a clean and easy to use substitute for aerosols, and provides that the contents—due to the Flair® inner container/outer container technology—never contacts the outside air or surroundings, thus being free of contamination and remaining fresh.

It is also noted that in exemplary embodiments of the present invention, because the Flairosol uses Flair® technology, the inner bottle will always be compressed by ambient pressure (or some other displacing medium) so as to shrink as the liquid is sprayed out over time. Thus, as is the case with all Flair technology, whatever liquid remains in the inner bottle is always available to be drawn by the piston into the piston chamber and then sent into the pressure chamber. No air pockets or gaps develop in the inner Flair® bottle, and there is no need to tie down the inner container at the bottom of the device to prevent crimping. Hence the efficacy of combining Flair® technology with a clean or "green" pressurized liquid spraying functionality akin to an aerosol, as in the various embodiments of the present invention.

What is claimed is:

1. A liquid dispensing device, comprising:

a main body and a dispensing head;

said main body comprising a pressure chamber, a pressure spring and a pressure piston;

and said dispensing head comprising:

a piston and a piston chamber, an outlet channel;

a central channel in fluid communication with both the outlet channel and the pressure chamber of the main body;

an inlet valve provided between said central channel and said piston chamber;

an outlet valve;

and an outlet valve lock, wherein the pressure chamber of the main body is arranged to be larger than the piston chamber of the dispensing head, such that the pressure chamber stores more than one downstroke's quantity of fluid, and wherein, in operation, in a compression stroke, liquid is pushed from the piston chamber into the central channel, and from the central channel towards both the pressure chamber and the outlet channel.

2. The liquid dispensing device of claim 1, wherein in a pressurizing operation, a fluid is drawn from the main body through the piston chamber in the dispensing head into the pressure chamber in the main body so as to pressurize the pressure chamber and compress the pressure spring.

3. The liquid dispensing device of claim 2, wherein in a spraying operation, when the pressure in the channel having reached a minimum value, if the outlet valve lock is released then the fluid sprays out the outlet channel.

4. The liquid dispensing device of claim 3, wherein said minimum pressure value is needed to open the outlet valve.

5. The liquid dispensing device of claim 3, wherein during a spraying operation if the pressure in the channel drops below the minimum pressure value, then the outlet valve closes.

6. The liquid dispensing device of claim 3, wherein during a spraying operation if the lock is not released, then the outlet valve closes.

7. The liquid dispensing device of claim 6, wherein the outlet valve closes even if the pressure in the channel is above the minimum value.

8. A liquid dispensing device, comprising:

a main body and a dispensing head;

said main body comprising a pressure chamber, a pressure spring and a pressure piston;

and said dispensing head comprising:

a piston and a piston chamber, an outlet channel;

a central channel in fluid communication with both the outlet channel and the pressure chamber of the main body;

an inlet valve provided between said central channel and said piston chamber;

an outlet valve;

wherein the pressure chamber of the main body is arranged to be larger than the piston chamber of the dispensing head, such that the pressure chamber stores more than one downstroke's quantity of fluid, and wherein, in operation, in a compression stroke, liquid is pushed from the piston chamber into the central channel, and from the central channel towards both the pressure chamber and the outlet channel.

9. The liquid dispensing device of claim 8, wherein in a pressurizing operation, a fluid is drawn from the main body through the piston chamber into the pressure chamber so as to pressurize the pressure chamber and compress the pressure spring.

10. The liquid dispensing device of claim 9, wherein in a spraying operation, when the pressure in the central channel having reached a minimum value, the fluid sprays out the outlet channel.

11. The liquid dispensing device of claim 10, wherein said minimum pressure value is needed to open the outlet valve.

12. The liquid dispensing device of claim 10, wherein during a spraying operation if the pressure in the channel drops below the minimum pressure value, then the outlet valve closes.

13. The liquid dispensing device of claim 1, wherein a spraying operation is abruptly stopped when a user engages the outlet valve lock.

14. The liquid dispensing device of claim 1, wherein the liquid is provided to the pressure chamber via the piston chamber by hand pumping.

15. The liquid dispensing device of claim 1, wherein the pressure chamber is spring loaded and wherein the liquid pumped into the pressure chamber pushes against the spring and stores energy in the spring.

16. The liquid dispensing device of claim 1, wherein the liquid is pumped into the pressure chamber under a pressure sufficient to open a pressure chamber entry valve.

17. The liquid dispensing device of claim 16, wherein the minimum pressure necessary to open said pressure chamber entry valve is greater than the minimum pressure necessary to open the outlet valve.

18. The liquid dispensing device of claim 1, wherein the main body comprises a an inner container provided in an outer container, and wherein said pressure chamber, pressure spring and pressure piston are provided within said inner container.

19. The liquid dispensing device of claim 18, wherein there is a displacement medium provided between the inner container and the outer container.

20. The liquid dispensing device of claim 19, wherein said displacement medium is air, and wherein the space between the outer surface of the inner container and the inner surface of the outer container is open to atmospheric pressure.

21. The liquid dispensing device of claim 1, wherein the volume of the piston chamber is greater than the volume of the pressure chamber by a factor of between 1.5 and 3.

22. The liquid dispensing device of claim 1, wherein said inlet valve is one of a dome valve and a dome valve with additional spring, and wherein said outlet valve is a shuttle valve.

* * * * *